(12) United States Patent
Viaud

(10) Patent No.: US 6,467,237 B2
(45) Date of Patent: Oct. 22, 2002

(54) LARGE ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 21 days.

(21) Appl. No.: 09/777,163

(22) Filed: Feb. 5, 2001

(65) Prior Publication Data

US 2001/0013214 A1 Aug. 16, 2001

(30) Foreign Application Priority Data

Feb. 12, 2000 (DE) .......................... 100 06 384

(51) Int. Cl.$^7$ .......................... B65B 63/02; A01F 15/07
(52) U.S. Cl. .......................... 53/118; 53/587; 56/341; 100/89
(58) Field of Search .......................... 100/87–89; 53/116, 53/118, 210, 211, 587–589; 56/341

(56) References Cited

U.S. PATENT DOCUMENTS

| | | | |
|---|---|---|---|
| 4,052,841 A | | 10/1977 | Rice et al. |
| 4,534,285 A | * | 8/1985 | Underhill ...................... 100/88 |
| 5,115,734 A | * | 5/1992 | Quartaert ...................... 100/88 |

FOREIGN PATENT DOCUMENTS

| | | | | |
|---|---|---|---|---|
| DE | 3415310 A1 | * | 10/1985 | ............ 100/89 |
| EP | 0 064 116 A | | 11/1982 | |

* cited by examiner

*Primary Examiner*—Stephen F. Gerrity

(57) ABSTRACT

A large round baler, designed as a non-stop baler, includes a mobile chassis supporting a lower baling chamber section, defined by a floor conveyor arrangement, and an upper baling chamber section. The upper baling chamber section, together with opposite side walls, is mounted for fore-and-aft movement relative to the lower baling chamber section between a rear location, wherein it cooperates with the floor conveyor arrangement to define a rear baling chamber, and a front location wherein it cooperates with the floor conveyor arrangement to define a front baling chamber. The upper chamber section includes front and rear wall portions which are mounted for being raised once a bale is formed in the rear baling chamber so that the upper section may be moved to its forward location. A wrapping device is provided which is operable once the upper chamber section is moved to its front location, for wrapping the bale with overlapping wraps of sheeting made from plastic or the like so as to provide an air tight casing for the crop material so as to make silage.

12 Claims, 4 Drawing Sheets

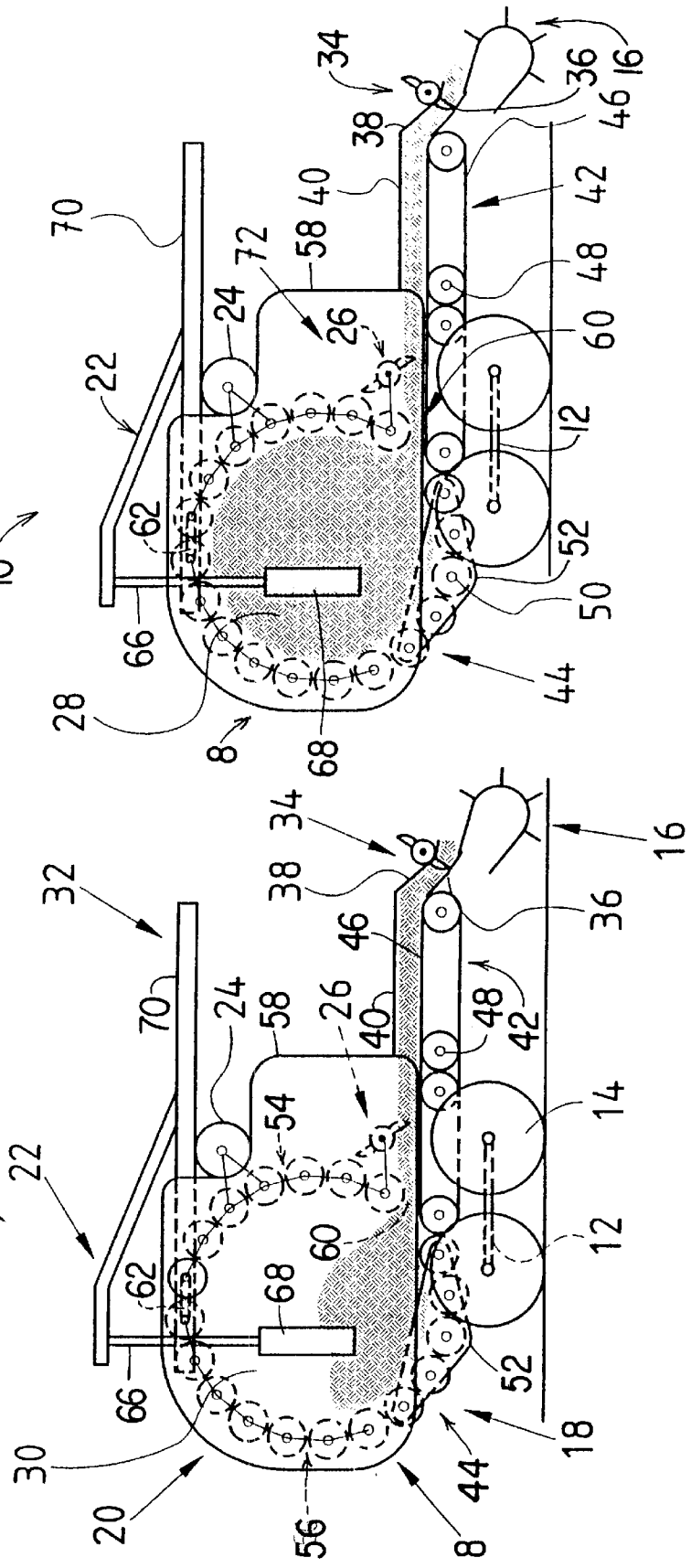

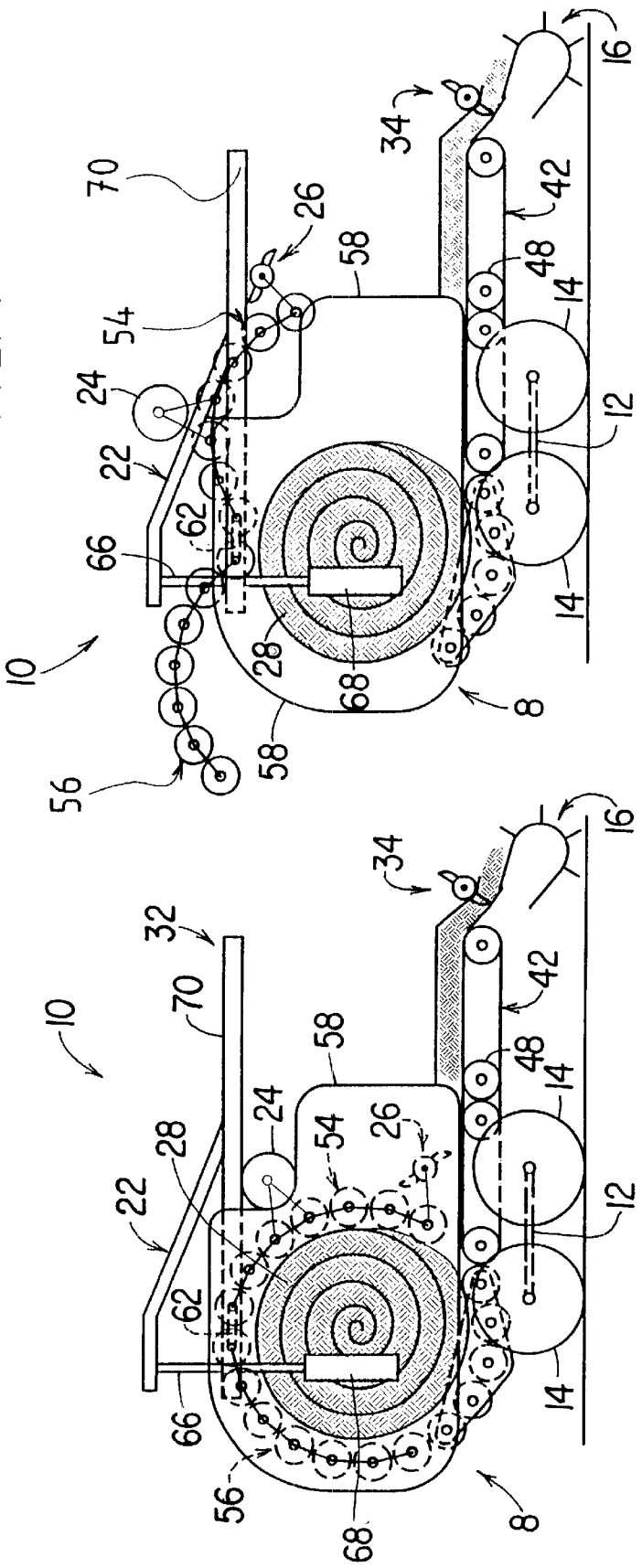

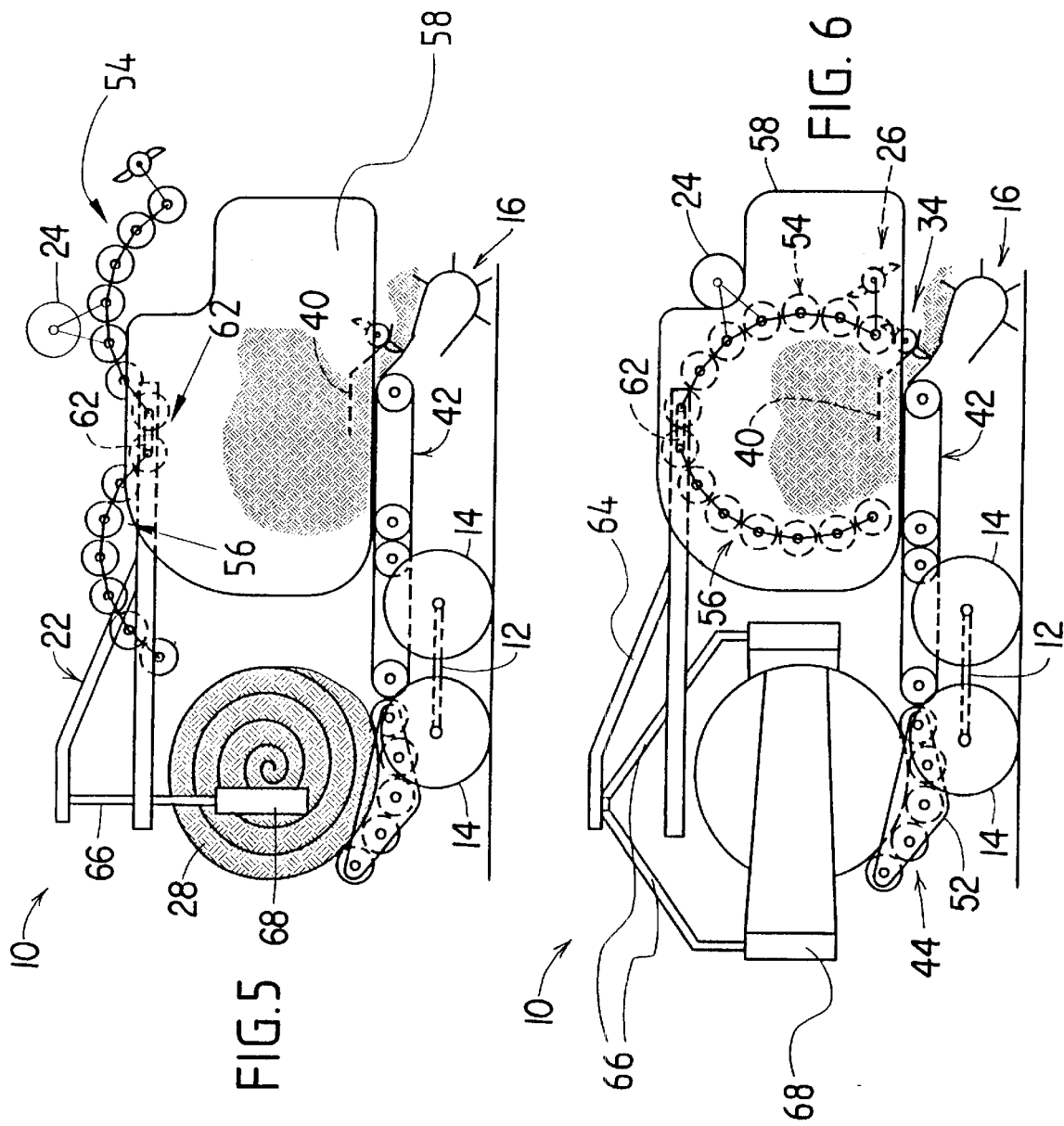

LARGE ROUND BALER

The invention concerns a large round baler of the type designed for operating non-stop during the processes of forming, binding and/or wrapping and discharging formed bales.

BACKGROUND OF THE INVENTION

EP-A-0 064 116 discloses a large round baler with a first and a second baling chamber, that can be charged alternately and thereby permit an uninterrupted operation. For this purpose, a set of belts is provided that extends over a front and a rear housing section and over an intervening region. In the central region, two tension arms are provided that are connected to each other in joints and that control the corresponding section of the belts in such a way that the baling chamber is formed in the front or the rear housing section. As soon as a cylindrical bale is formed in the rear baling chamber, it is wrapped there and ejected. At the same time, a cylindrical bale is formed in the front baling chamber and laid upon a side conveyor after its completion for deposit alongside the baler.

The problem underlying the invention is seen in the fact that a separate conveyor is required for the delivery of the cylindrical bale from the front baling chamber and that a costly mechanism is necessary in order to guide the belts correspondingly.

SUMMARY OF THE INVENTION

According to the present invention there is provided a novel continuously operating baler.

An object of the invention is to provide a continuous baler wherein an upper baling chamber section including a pair of side walls is movable fore-and-aft relative to front and rear conveyors of a lower baling chamber section so as to cooperate with the latter to respectively define front and rear baling chambers for alternately receiving crop during the baling process.

A more specific object of the invention is to provide a continuous baler, as defined in the previous object, wherein the upper chamber section includes front and rear portions in the form of a plurality of rolls located so as to define a circular arc when in respective lowered positions, and so as to permit wrapping of a formed bale located on the rear conveyor, and its discharge from the baler after being wrapped, when the front and rear chamber portions of the upper chamber section are in their respective raised positions.

These and other objects of the invention will become apparent from a reading of the ensuing description together with the appended drawings.

BRIEF DESCRIPTION OF THE DRAWINGS

FIG. 1 shows a schematic side view of a large round baler constructed in accordance with the principles of the present invention, with the baler being shown in a condition filling a rear baling chamber.

FIG. 2 shows the large round baler of FIG. 1 in a condition wherein the rear baling chamber has become filled with crop material.

FIG. 3 shows the baler of FIG. 1 during a binding process.

FIG. 4 shows the baler of FIG. 1 during the feeding of crop into a region above a front conveyor and with upper front and rear wall portions of the upper baling chamber section being shown in a raised condition.

FIG. 5 shows the baler of FIG. 1 in a condition where the front and rear wall portions of the upper chamber section, together with opposite side walls of the baling chamber, are shifted to a forward region above a floor conveyor.

FIG. 6 shows the baler of FIG. 1, where the front and rear wall portions of the upper chamber section are once again lowered to form a forward-located baling chamber and the cylindrical bale previously formed in the rear-located baling chamber is being wrapped with sheeting.

DESCRIPTION OF THE PREFERRED EMBODIMENT

Figure 7:
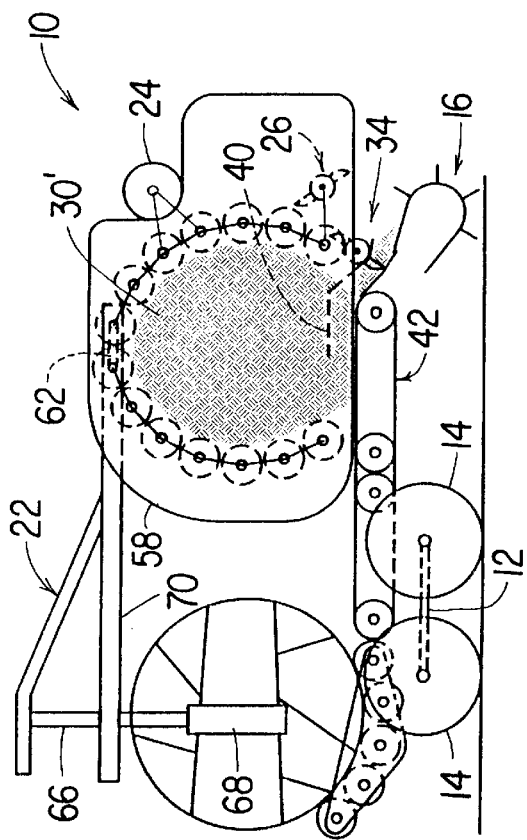
FIG. 7 shows the baler of FIG. 1 where the wrapping process has been completed.

A large round baler 10, constructed in accordance with the present invention, is shown in the drawing and includes a chassis 12, wheels 14, a crop intake arrangement 16, a lower baling chamber section 18, an upper baling chamber section 20, a housing 8 defining opposite baling chamber side walls, a wrapping device 22, a binding device 24 and a rotary feeder 26.

The baler 10 generally represents a machine that can be operated continuously, that is to say, without interrupting the operation during discharge of a completed cylindrical bale 28. Beyond that, it is equipped with the necessary devices to bind the cylindrical bale 28 with twine or wrap it with foil, such as plastic sheeting, for example. Crops such as grass, hay, straw and the like can be baled in dry or wet condition, in order to produce silage.

The chassis 12 is joined to a support frame, not shown, that can be attached by a towbar, also not shown, to a towing vehicle for operation across a field. The chassis 12 is configured relatively long so as to form space for rear and front baling chambers 30 (FIGS. 1–3) and 30' (FIGS. 6–8), respectively, but, as will be presently described, these baling chambers are not composed of two sets of entirely different components but rather are of a configuration where a considerable part of the baling chambers is movable so as to respectively form a part of each baling chamber. This simplification of the configuration is accompanied by a corresponding reduction in the total weight.

A guide arrangement 32 is provided that is generally parallel to the ground on which the baler is supported or operated, which extends fore-and-aft in the direction of travel generally over the entire length of the chassis 12 and provides a free space to the support frame which, in the preferred embodiment, corresponds to the height of the baling chambers 30 or 30'. Nevertheless, the guide arrangement 32 can also extend lower than the height of the baling chambers 30 or 30'.

In the preferred embodiment, the wheels 14 are attached to two tandem axles and spring-mounted to the chassis 12, but this is not an absolute requirement.

The crop intake arrangement 16 is configured in a known manner as a pick-up conveyor, that is, it is provided with a multitude of tines circulating in vertical planes that raise crop from the ground and convey it upward. At the outlet end of the crop intake arrangement 16, an intermediate conveyor 34 is provided, which can be configured as a rotary cutter, and conveys crop through a channel defined by and located between a bottom 36 of the crop intake arrangement 16 and a sheet metal guide vane 38 that extends at an upward inclination, where the intermediate conveyor 34 extends with tines, not described in any further detail, through slits, not shown clearly, in the sheet-metal guide vane 38, and grasps the crop. The inclined sheet-metal guide vane 38 has a rear end joined to a front end of opposite side guide vanes 40, that generally extend horizontally and border the lower chamber section 18 at their sides so as to continue the aforementioned channel. In this way the crop is prevented from falling down at the sides.

In this special embodiment, the lower chamber section 18 includes a front conveyor 42 immediately followed by a rear conveyor 44, with the conveyors serving to carry the crop taken in on their upper surfaces. Altogether, the two conveyors 42 and 44 extend generally over the length of the chassis 12. Both conveyors 42 and 44 have a conveying surface of the same width, but not necessarily of the same length. The conveyors 42 and 44 are driven in a conventional manner, for example, by chains or shafts or by means of hydraulic motors, preferably synchronously. Nevertheless, differing drive speeds can be selected, in particular, if the front conveyor 42 is incorporated into the baling process of the cylindrical bale 28 and the rear conveyor 44 is incorporated into the wrapping process of another cylindrical bale 28. The lower baling chamber section 18 can be configured as a one-piece component and be provided over its entire length, for example, with a belt conveyor or a bar-chain conveyor or a multitude of rolls on parallel axes.

The front conveyor 42 follows immediately upon the outlet end of the crop intake arrangement 16, that is, at the outlet end of the channel formed by the bottom 36 and the sheet-metal guide vane 38. The front conveyor 42 is configured as a belt conveyor and contains a conveyor belt 46 and several deflecting or driven pulleys 48 that support the belt. The pulleys 48 are arranged in such a way that the upper span of the conveyor belt 46 is planar; nevertheless, the rolls 48 could also be arranged in such a way that a depression or cavity that forms a circular segment in side view results in which the cylindrical bale 28 can be partially accommodated. The front conveyor 42 spans the region between the crop intake arrangement 16 and the rear conveyor 44 in the condition according to FIGS. 1 and 2, and in the condition according to FIGS. 3 through 5, as a storage area for crop that has been accepted by the crop intake arrangement 16, but cannot be delivered to the baling chamber 30 located at the rear, and, in the condition according to FIGS. 6 through 8, as a carrier and drive means for a cylindrical bale 28 that is being formed.

Figure 8:
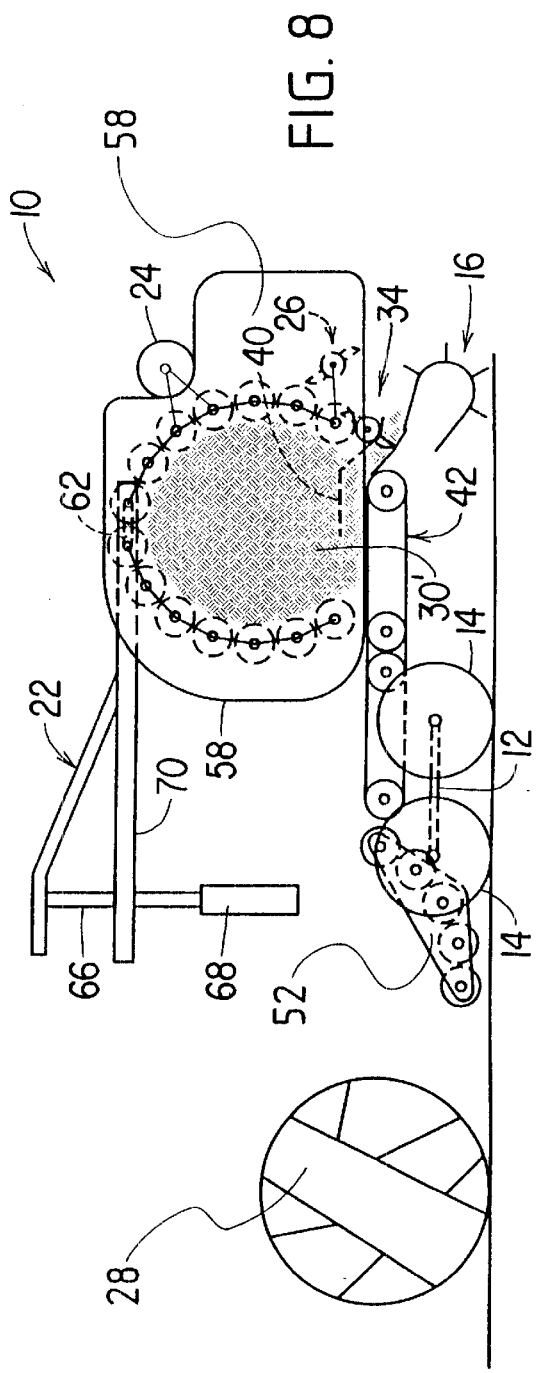
FIG. 8 shows the baler of FIG. 1 at the time where the wrapped bale is ejected.

The rear conveyor 44 is configured in the form of a pan, whose bottom is formed by rolls 50, that are arranged so as to lie along a segment of a circle. The rolls 50 are supported, as by bearings, for free rotation in side walls 52 located at the opposite ends of the rolls, with at least some of the rolls 50 being driven. The rear conveyor 44 is mounted to the chassis 12 for vertical pivotal movement about a horizontal axis that is coincident with the longitudinal axis of the front-most roll 50, with the conveyor 44 being movable between a raised, operating condition, as shown in FIGS. 1–7, and a lowered, discharge position, as shown in FIG. 8. The rear lower conveyor 44 is retained in its raised operating position by a locking arrangement, not shown, and can be repositioned, for example, by a hydraulic motor. Except for the discharge condition, the conveyor 44 always carries crop, either for the forming of a cylindrical bale 28, and then for supporting the formed bale for wrapping and discharge. As will become apparent from the following description, with the front and rear conveyors 42 and 44, respectively, being formed by belts, chains or the like and by a plurality of rolls located on a circular arc, different functions may be attained. For example, the rolls are appropriate for resisting the high compacting forces during the baling process, while the belts, chains or the like can border the underside of an intermediate storage area for the crop in the starting phase of the formation of the bale, and convey the loose crop. With loose or crumbling crop, the application of a belt conveyor forming the entire lower housing section has the advantage that leaves and other loose plant components are not lost, but remain contained in the mass of the crop.

The upper baling chamber section 20 cooperates with the lower chamber section 18 to form the upper region of the rear baling chamber 30 when the chamber section 20 is above the rear conveyor 44, and to form the upper region of the front baling chamber 30' when the chamber section 20 is in a forward location above the front conveyor 42. The upper chamber section 20 is supported in bearings for movement in the direction of travel along the fore-and-aft extending guide arrangement 32 so as to move horizontally, relative to the lower chamber section 18, between rear and front positions respectively above the rear and front conveyors 44 and 42. The upper chamber section 20 is divided into front and rear chamber wall portions 54 and 56, respectively, that extend between and have respective upper rear and upper front ends pivotally attached to opposite side walls 58.

The front and rear upper chamber wall portions 54 and 56 are configured generally similarly and are arranged in mirror image manner to each other and surround the circumference of the baling chamber 30 or 30' to approximately 240°. Both wall portions 54 and 56 include rolls 50 that are retained, free to rotate, in arcuate side frames, the axes of rotation of the rolls 50 being located along a circular path when the wall portions 54 and 56 are in their respective lowered working positions as illustrated in FIGS. 1 through 3. An inlet opening is provided between the lower end roll 50 of the upper front wall portion 54 and the upper surface of the front conveyor 42 when the wall portion 54 is in its lowered working position. The upper rear and upper front ends respectively of the chamber wall portions 54 and 56 are connected to each other by a joint 62 and are each mounted in the joint 62 for pivoting vertically, so that they can be swung upwardly from their respective lowered working position to a raised non-working position, as illustrated in FIG. 5. For moving the chamber wall portions 54 and 56 between their working and non-working positions, combined or separate actuation devices, not shown, for example, hydraulic cylinders or rope pulls may be employed.

The actuation devices can be controlled, configured or arranged in such a way that the chamber wall portions 54 and 56 can simultaneously assume the raised position, shown in FIG. 5, wherein the opposite ends of each portion lie on a substantially horizontal plane. Both of the chamber wall portions 54 and 56 can be moved as a unit, together with the opposite side walls 58, along the guide arrangement 32.

Although the chamber wall portions 54 and 56 are shown as including a plurality of the rolls 50, the rolls can be replaced by rolls, or the like, over which belts or chains can be conducted. Instead of there just being two chamber wall portions 54 and 56 interconnected by a single joint 62, it is possible to employ a multitude of chamber wall portions connected to each other by joints which, nevertheless, can assume the shapes of the chamber wall portions 54 and 56 that are shown in FIGS. 3 and 4.

The side walls 58 extend to the side of the rolls 50 and form the vertical side walls of the baler housing 8. The walls 58 are so dimensioned that they enclose the baling chamber 30 or 30' at the sides when the chamber wall portions 54 and 56 are located in their lower working positions as well as form a chamber 72 that is bordered at the bottom by the front conveyor 42 and at the rear by the front side of the upper front chamber wall portion 54. The sheet-metal side guide vanes 40 project by a small degree into the chamber 72, so that crop is safely conducted into it. The sheet-metal side guide vanes 40 and the walls 58 can also be connected to each other so that the guide vanes 40 are moved as a whole, or only in some regions, when the walls 58 are moved. The outside of the walls 58 are located opposite the inside of a pair of rails 70 forming part of the guide structure 32, so that the entire upper baling chamber section 20 can be shifted within the space located between the rails 70. The walls 58 are aligned with the side walls 52 of the lower chamber section 18 and end in their upper edge in a horizontal intersecting point, so that they cannot collide when the upper chamber section 20 is moved horizontally.

At the lower end region of the upper front chamber wall portion 54 that borders the inlet opening 60, the feeder 26 is provided in such a way that it can pivot vertically with the upper front chamber wall portion 54.

The wrapping device 22 is used for wrapping a completed cylindrical bale 28 with foil, such as plastic sheeting, so that the bale 28 containing moist crop becomes silage feed. As can best be seen in FIG. 6, the wrapping device 24 includes a carrier 64, a wrapping arm 66 and wrapping material 68. The wrapping arm 66 is supported in bearings, free to rotate about a vertical axis, on the carrier 64 and extends from the axis of rotation initially inclined radially outward and downward, and subsequently downward so as to be disposed along the axis of the roll of wrapping material 68, in order to carry and deliver the wrapping material 68. The wrapping arm 66 is dimensioned and arranged in such a way that the inclined region remains between the guide rails 70 and that the region carrying the wrapping material 68 can move diametrically about the cylindrical bale 28. Instead of only one, several wrapping arms 66 could be provided, in order to reduce the wrapping time. The wrapping arm 66 is brought into rotation by a drive (not shown) supported by the carrier 64 and coupled to the axle carrying the arms 66.

As a rule, the wrapping material 68 is formed by a stretch foil that is applied to the cylindrical bale 28 under high tension and adheres to previous layers on the basis of adhesion. While the wrapping material 68 is applied to the cylindrical bale 28, the cylindrical bale 28 continues to rotate slowly, so that the individual layers come to lie offset from one another.

Furthermore, the wrapping device 22 is provided with retaining, tensioning and separating or severing devices for the wrapping material 28, each of which is not shown but is known in itself and are used to initiate the beginning and the end of the bale wrapping process. The bale wrapping process always occurs after the cylindrical bale 28 is deposited on the rear conveyor 44. The wrapping arm 66 can move freely around the cylindrical bale 28 as soon as the upper chamber section wall portions 54 and 56 are raised from their respective operating region and moved forward on the guide rails 70, along with the side walls 58.

The binding device 24 is configured as a net binding device and is attached to an upper forward location of the opposite side walls 58 so as to be adjacent the front of the upper forward chamber wall portion 54, when the latter is in its lowered working position. Alternatively, the binding device 24 could be mounted to the support structure for the rolls 50 of the chamber wall portion 54 so as to move with the portion 54 when it is pivoted vertically. Instead of net, a twine binding or foil binding device could be provided. In each case, the binding material is introduced in a known manner through the inlet opening 60 or through a gap between the rolls 50 into the baler housing 8 and wound around the rotating cylindrical bale 28. The binding device 24 is located at the upper chamber section 20 because the cylindrical bale 28 is bound while it is still subject to the pressure in the baler housing 8.

The feeder 26 is configured as a driven rotor that rotates about a horizontal axis and is equipped with fingers, tines or other conveying elements. The feeder 26 is arranged in such a way that the crop arriving from the front conveyor 42 is slid safely into the inlet opening 60 and is not jammed there. This function is accomplished by the feeder 26 in that it rotates in a clockwise direction, as viewed in FIG. 1, for example. The drive to the feeder 26 is reversible and when the feeder 26 rotates in the reverse direction, it moves the crop from the inlet opening 60 and conveys it into the region of the baling chamber 30' for being partially formed into a bale there. Alternatively, the front lower conveyor 42 could also be temporarily driven slowly in reverse, or it could be brought to a halt and thereby either move the incoming crop away from the inlet opening 60 or momentarily hold it back.

In the preferred embodiment, the guide arrangement 32 is provided with rails 70 that extend over the entire length of the chassis 12 and are configured or arranged to be so stable that they can carry the weight of the upper chamber section 20. The guide arrangement 32 is provided with a drive, not described in any further detail, that contains, for example, a rack and a gear motor or rope pulls and sliding or rolling guides with which the upper chamber section 20 can be moved along the rails 70 of the guide arrangement 32.

The rails 70 are arranged parallel to each other and considerably above the chassis 12 and formed, for example, by an U-profile, an L-profile or a T-profile, so that the joint 62 and possibly stabilizing struts can be guided along their lengths for the retention of the upper chamber section 20.

On the basis of the above description, the large round baler 10 operates as follows.

Assume the large round baler 10 to be in a condition where it has not taken any crop up and that the upper chamber section 20 is located above the rear, lower conveyor 44. This condition is shown generally in FIG. 1, where however, some crop already taken up is shown.

At the beginning of the operation of the large round baler 10, the crop intake arrangement 16 takes up crop from the ground and conveys it upward to the rear through the channel defined between the bottom 36 and the inclined sheet-metal guide vane 38, and then into the channel defined between the front lower conveyor 42 and the horizontal sheet-metal guide 40. The front lower conveyor 42 carries the crop on the conveyor belt 46 that is equipped, if necessary, with battens or other drivers, up to the intake opening 60, where it is grasped by the feeder 26 and forced through the inlet opening 60 into the baling chamber 30, this condition being that shown in FIG. 1.

The crop collects on the rear lower conveyor 44 until it is brought into rotation as a mound by the rotating rolls 50. The more the baling chamber 30 is filled, the more the crop is compressed into a cylindrical bale 28 and continuously rotated. This condition is shown in FIG. 2.

As soon as the bale 28 has reached the desired density, the binding device 24 is brought into operation and the cylindrical bale 28 is bound with net, twine or the like, in accordance with a known process. During the binding process, the crop intake arrangement 16 continues to operate and delivers crop to the front lower conveyor 42. This crop is not forced into the intake opening 60, but is collected in front of it by the feeder 26 that is now operating in the backward direction. This condition is shown in FIG. 3. After the binding process and while crop principally accumulates in the chamber 72, the front and the rear chamber wall portions 54 and 56 are pivoted upward and free the cylindrical bale 28. This condition is shown in FIG. 4.

While the chamber wall portions 54 and 56 are raised, they are shifted along the guide arrangement 32 to the front over the cylindrical bale 28 and over the crop accumulated on the front conveyor 42. Since both chamber wall portions 54 and 56 are raised, the baling chamber 30 is open at the front and the rear, and the front chamber wall portion 54 does not push the crop along in front of it on the lower conveyor 42 during its forward movement. In the end position of the upper chamber section 20, both chamber wall portions 54 and 56 are located as a pincer above the mound of crop formed on the front lower conveyor 42. This condition is shown in FIG. 5.

After the upper chamber section 20 has been slid, rolled or otherwise moved, the two chamber wall portions 54 and 56 are lowered so that they enclose the crop between themselves and the front lower conveyor 42 and form the baling chamber 30' at the front of the baler 10. The crop brought in by the crop intake arrangement 16 now moves again through the intake opening 60 and reaches the baling chamber 30', if necessary supported by the feeder 26, which is now again driven in the clockwise direction as seen in the drawing. While the crop in the front baling chamber 30' is at least being pre-compressed, in the case that the previously formed cylindrical bale 28 is to be wrapped with foil, then the wrapping arm or arms 66 are brought into rotation and thereby apply wrapping material 68 to the bale 28, until an airtight surface is attained. This condition being shown in FIG. 6.

As soon as the wrapping of the cylindrical bale 28 is completed, the wrapping process is ended and the wrapping arm or arms 66 are brought into a position in which they do not hinder an unloading of the cylindrical bale 28. This condition can be seen in FIG. 7.

After the wrapping process, the rear lower conveyor 44 is pivoted vertically in the counterclockwise direction, as viewed in FIG. 8 for example, so that the cylindrical bale 28 resting on it is slid to the rear onto the ground, while in the baling chamber 30' located at the front, crop continues to be compressed.

Finally the upper chamber section 20, with the crop contained in it, is moved to the rear, up to the rear lower conveyor 44, where the baling process is continued and ended. Except for the fact that there is less crop material contained in the baling chamber 30 than what is shown in FIG. 8, the condition of the baler 10 is once again like that illustrated in FIG. 1.

What is claimed is:

1. In a baler for making large cylindrical bales, the baler including a mobile chassis supporting opposite side walls which cooperate with a bale-forming arrangement to define front and rear baling chambers, the improvement comprising: said bale-forming arrangement including lower and upper baling chamber sections, respectively, that are separate one from the other; said upper baling chamber section being subdivided into front and rear chamber wall portions, respectively, that are mounted to said chassis for swinging vertically between a lowered working position, wherein the front and rear chamber wall portions cooperate with the lower chamber section to enclose and form a cylindrical bale, and a raised non-working position, wherein the baling chambers are opened; said upper baling chamber section being mounted to said side walls; and said side walls being mounted to said chassis for horizontal movement relative to said lower chamber section.

2. The baler defined in claim 1 wherein said upper baling chamber section is formed exclusively by said front and rear baling chamber wall portions.

3. The baler defined in claim 1 wherein said front and rear chamber wall portions are vertically pivotally mounted such that when they are moved to their raised positions they are spaced from said lower chamber section by a height commensurate with a fully-formed bale located in said front or rear baling chamber.

4. The baler defined in claim 1 wherein said lower chamber section is defined by a rear lower conveyor; a front lower conveyor being mounted on said chassis at a location in front of said rear conveyor so as to deliver crop to said rear conveyor; and said upper baling chamber section being mounted to said chassis for horizontal movement between a rear location, wherein it cooperates with said rear lower conveyor to define said rear baling chamber, and a forward location, wherein it cooperates with said front lower conveyor to define said front baling chamber.

5. The baler defined in claim 4 wherein said front lower conveyor is a belt conveyor.

6. The baler defined in claim 4 wherein said chassis includes a guide arrangement including a horizontal, fore-and-aft extending support structure spaced above said rear and front lower conveyors; and said upper chamber section being mounted, together with said side walls, for moving horizontally along said support structure.

7. The baler defined in claim 4 wherein said front wall portion of said upper chamber section has a lower front end spaced above said front conveyor so as to define an inlet opening to said rear baling chamber when said upper chamber section is located above said lower rear conveyor; and a rotary feeder being mounted to said front chamber wall portion of said upper chamber section in the vicinity of said inlet opening so as to assist the movement of crop material into said inlet.

8. The baler defined in claim 7 and further including a reversible drive coupled to said rotary feeder so that said feeder may be driven in opposite directions.

9. The baler defined in claim 1 and further including a wrapping device for encasing a formed bale with foil material; said wrapping device being mounted to said chassis in a region above said lower baling chamber section and including an arm mounted for revolving about a vertical axis located above said upper chamber section; and said horizontal movement of said upper chamber section being done after said front and rear wall portions of said upper chamber section are swung vertically to their non-working positions and being of sufficient distance to remove the upper chamber section from a path traced by said arm of said wrapping device as the latter revolves about said vertical axis.

10. The baler defined in claim 1 wherein said lower baling chamber section includes a rear conveyor portion mounted to said chassis for pivoting vertically so as to be able to discharge a formed bale resting thereon to the rear and onto the ground once the rear wall portion of the upper chamber section is raised to open the rear baling chamber.

11. The baler defined in claim 1 wherein a binding device is mounted to one of said side walls or said upper chamber section so as to be adjacent a front side of said front wall portion of said upper chamber section when the latter is in its lowered working position.

12. The baler defined in claim 1 wherein a rear portion of said lower chamber section and said upper chamber sections each include a plurality of bale-forming rolls, which rolls are each located on a circle arc.

* * * * *